May 12, 1925.  1,537,903
E. VON LEPEL
CONNECTION FOR THE IGNITION OF EXPLOSION MOTORS
Filed Sept. 30, 1922
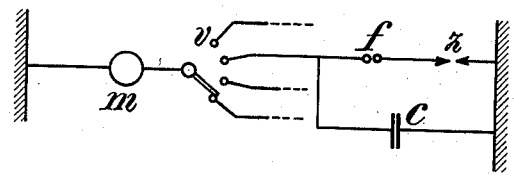
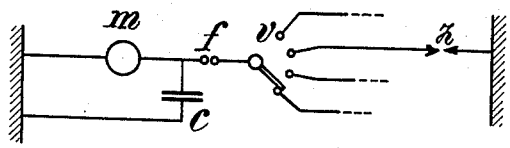
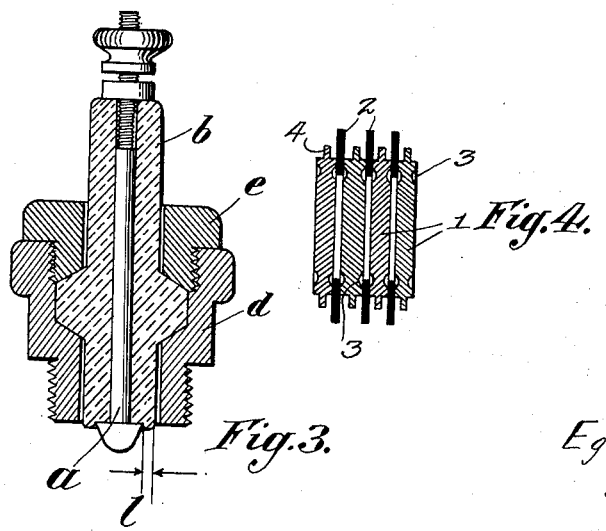
Inventor:
Egbert von Lepel
Attorney.

Patented May 12, 1925.

1,537,903

UNITED STATES PATENT OFFICE.

EGBERT VON LEPEL, OF BERLIN-WILMERSDORF, GERMANY.

CONNECTION FOR THE IGNITION OF EXPLOSION MOTORS.

Application filed September 30, 1922. Serial No. 591,555.

*To all whom it may concern:*

Be it known that I, EGBERT VON LEPEL, a citizen of the German Republic, residing at Berlin-Wilmersdorf, Germany, have invented certain new and useful Improvements in Connections for the Ignition of Explosion Motors, of which the following is a specification.

It has already been proposed to improve the ignition of explosion motors by connecting in parallel to the spark plug a condenser or by inserting in the connection a series spark gap. According to the first arrangement a hotter spark is produced but only if the spark plug is in order. If the spark plug is however sooted so that a determined ohmic resistance is parallel to the same the retardation of the increase of voltage produced by the condenser is detrimental as this voltage has a longer time for flowing off through the bridge formed by the sooting. In this case the condenser will consequently make the ignition worse. The series spark gap ensures however that, even if the spark plug is sooted a spark jumps over but this spark is very thin only as it is due merely to the capacity of the leading-in cables this capacity being insufficient to take up the total quantity of current of the ignition inductor and the little electricity accumulated in said cables is consumed long before the ignition inductor has ceased to supply current so that the greatest part of the igniting energy flows afterwards across the soot-bridge.

According to the invention the two arrangements are combined by mounting in series with the sparking plug a spark gap and in mounting a condenser in parallel with both these spark gaps.

In order that the invention may be clearly understood, I shall proceed to describe the same with reference to the improved connection which is diagrammatically shown, by way of example, on the accompanying drawing, wherein:

Fig. 1 shows a connection for a motor with four cylinders in which a spark gap and a condenser are included in each ignition circuit.

Fig. 2 shows a connection for a motor with four cylinders in which one single condenser is mounted parallel to the secondary winding of the ignition inductor and one single series spark gap is mounted behind this condenser in the high-tension line in front of the distributor.

Fig. 3 is a cross-sectional view of a conventional type of spark plug.

Fig. 4 is a cross-sectional view of the series quenched spark gap.

In Fig. 1 $m$ designates the high-tension source, for instance a magnet inductor, $v$ the distributor, $z$ a spark plug, $f$ the series spark gap and $c$ the condenser which serves to bridge over from the series spark gap to the spark plug. The voltage supplied by the ignition inductor $m$ across the distributor $v$ recharges first the condenser. The series spark gap prevents the charge from flowing off immediately through the soot bridge. Only at the instant when the voltage has increased so that the series spark gap is punctured will the charges get to the spark plug. At this spark plug a spark is produced across the spark gap or across the sooting if the latter path is short enough and the entire quantity of electricity accumulated in the condenser follows this path in the form of a high frequency discharge. This takes place so rapidly that the loss in the soot bridge is infinitesimally small.

By this improved connection arrangement a considerably improved form of the high voltage curve of the magneto or of the high-tension source is produced, as, in opposition to what is usually the case, that namely the principal part of the voltage acting at the spark plug increases comparatively slowly at the high-tension pole of this spark plug which is generally sooted so that during this time a considerable loss of voltage occurs, by the use of the improved arrangement the slow increase of voltage at the condenser and at the series spark gap takes place almost entirely free from loss as it is easy to well insulate the condenser and the series spark gap. The spark is supplied from the condenser, which may now be considered as source of current, the voltage at the spark plug increasing, as there is no high self-inductance, to the puncturing voltage in a minimal fraction of the time which was formerly required. With this proportion of time correspond also the losses which are produced at the spark plug by leaking. It has further to be considered that almost the entire output of an ignition period is accumulated in the condenser so that it is immediately available, the flowing current becoming thus so strong that it burns soot parts which it encounters upon its path. The effect of the arrangement is therefore approximately as if a magneto were used which has a much steeper curve of voltage and a much greater capacity than usual.

This circumstance is an inducement for mounting a condenser parallel to the secondary winding of the source of voltage and a series spark gap behind the same in the high tension line before it joins to the distributor.

In Fig. 2 such an arrangement is shown. In this figure $m$ designates the source of high voltage, $v$ a distributor, $z$ a spark plug, $c$ the condenser and $f$ the series spark gap. This form of construction presents the advantage that for all spark plugs only one condenser and one series spark gap are required. This arrangement is preferably used, owing to the otherwise occurring damping of the high frequency circuit, in all such cases where the leads to the spark plugs possess low resistance and low capacity. Under all other conditions it is advisable to insert the new arrangement behind the distributor in the circuit for each spark plug in the closest possible proximity of the spark plug in order to keep the detrimental damping of the high frequency circuit so low as possible. The condenser will be however arranged preferably at a point which is protected against the heat from the motor so that the electric resistance of the condenser is not prejudiced.

The influencing of the voltage-curve and of the current-curve of the high-tension source by the connection according to the invention goes so far that, even if the solid insulating surface between the electrodes of the spark plugs which is exposed to sooting possesses only a minimum length, for instance a length of 1 millimeter or less, and if this surface is considerably sooted, no loss of tension worth mentioning is caused by the bridge of soot. The discharge takes place also in this case in the form of a spark which burns the soot bridge totally and adopts consequently the form of a very hot electric arc in which the calories contained in the soot are utilized for the production of the igniting heat. In this manner it becomes possible to substitue for the usual spark plug with free electrodes which are separated by solid insulators with the largest possible insulating surface, those in which the igniting electrodes bear directly upon the insulator. The short distance between the electrodes represents at the same time the width of the entire sooted surface of the insulator.

The spark plug shown in Fig. 3 has the usual outer shell $d$ or ground electrode, a central electrode $a$, an insulator $b$, and a securing nut $e$ which secures the insulator in the shell $d$. The distance designated $l$ is that part of the surface of the insulator $b$ over which the sparks slide from the central electrode $a$ to the ground electrode $d$.

In order to ensure the proper working of the arrangement described it is necessary that the properties of the series spark gaps are maintained as constant as possible, specially for the reason that the ignition spark gaps represent already a variable element.

In order that also with the most rapid succession of sparks one spark be of the same good quality as the other and in order that as little energy as possible be lost in the series spark gaps it is advisable to construct these series spark gaps in the well known manner as quenched spark gaps and to subdivide the same according to requirement.

Such a gap is shown in Fig. 4, in which a plurality of plates 1 are arranged in spaced relation from each other by means of insulating rings 2, the gaps being formed between the plates as shown. At the inner edge of the ring a channel 3 is provided and each plate is provided with a rib 4 for the purpose of cooling the plates.

I claim:—

1. An ignition circuit comprising a source of electric energy; a quenched spark gap connected with said source of energy; a spark plug connected with said source of energy; and an electric capacity connected in parallel with said quenched spark gap and said spark plug.

2. An ignition circuit comprising a source of electric energy; a quenched spark gap connected with said source of energy; a spark plug so constructed that the sparks slide over the surface of an insulator connected with said source of energy; and an electric capacity connected in parallel with said gap and said spark plug.

3. An ignition circuit comprising a source of electric energy; an electric capacity connected across said source of energy; a quenched spark gap connected in series with said source of energy; a distributor in series with said source of energy and said gap; and a spark plug in series with said distributor, said gap and said source.

4. An ignition circuit comprising a source of electric energy; an electric capacity connected across said source of energy; a quenched spark gap connected in series with said source of energy; a distributor in series with said source of energy and said gap; and a spark plug so constructed that the sparks slide over the surface of the insulator in series with said distributor, said gap and said source.

5. An ignition circuit comprising a source of electric energy; an electric capacity connected across said source of energy; a distributor in series with said source of energy; a quenched spark gap connected in series with said source of energy and said distributor between the distributor and the capacity connection; and a spark plug in series with said distributor, said gap and said source.

In testimony whereof I affix my signature in presence of two witnesses.

EGBERT von LEPEL.

Witnesses:
E. H. HERSMANN,
ROGER T. AUSPACR.